(12) United States Patent
Trincia

(10) Patent No.: US 10,800,503 B2
(45) Date of Patent: Oct. 13, 2020

(54) FLOATING VESSEL AND METHOD OF OPERATING A FLOATING VESSEL

(71) Applicant: Nuovo Pignone Tecnologie Srl, Florence (IT)

(72) Inventor: Francesco Trincia, Florence (IT)

(73) Assignee: NUOVO PIGNONE TECNOLOGIE SRL, Florence (IT)

( * ) Notice: Subject to any disclaimer, the term of this patent is extended or adjusted under 35 U.S.C. 154(b) by 0 days.

(21) Appl. No.: 15/872,431

(22) Filed: Jan. 16, 2018

(65) Prior Publication Data

US 2018/0201352 A1 Jul. 19, 2018

(30) Foreign Application Priority Data

Jan. 16, 2017 (IT) .......................... 102017000003996

(51) Int. Cl.
*B63H 21/16* (2006.01)
*B63B 25/16* (2006.01)
(Continued)

(52) U.S. Cl.
CPC ............. *B63H 21/16* (2013.01); *B63B 25/16* (2013.01); *B63H 21/17* (2013.01); *B63H 21/20* (2013.01);
(Continued)

(58) Field of Classification Search
CPC .............. B63H 21/20; B63H 2021/202; B63H 2021/205; B63H 2021/207; F01K 23/06; F01K 23/10; F01K 23/106; F22B 1/1815
See application file for complete search history.

(56) References Cited

U.S. PATENT DOCUMENTS

| 6,516,603 B1 | 2/2003 | Urbach et al. |
| 2008/0236261 A1 | 10/2008 | Ono et al. |
| 2009/0215328 A1* | 8/2009 | Daffey ................... B63H 21/20 440/1 |

(Continued)

FOREIGN PATENT DOCUMENTS

GB 2 442 770 A 4/2008

OTHER PUBLICATIONS

Marine Insight, Chakraborty, Soumya, "How The Power Requirement Of A Ship Is Estimated?", https://www.marineinsight.com/naval-architecture/power-requirement-ship-estimated/ , archived on Oct. 19, 2016, retrieved on Mar. 26, 2019 (Year: 2016).*

(Continued)

*Primary Examiner* — Andrew Polay
(74) *Attorney, Agent, or Firm* — Baker Hughes Patent Org.

(57) ABSTRACT

According to one aspect of the present disclosure, a floating vessel, particularly an LNG carrier, is described. The floating vessel comprises: a gas turbine engine-generator assembly configured to generate a first electrical power and to supply the first electrical power to an electrical distribution system; a steam turbine engine-generator assembly configured to generate a second electrical power and to supply the second electrical power to the electrical distribution system; a propulsion system configured to propel the floating vessel using a propulsion power supplied from the electrical distribution system, wherein the gas turbine engine-generator assembly is configured to generate a maximum first electrical power between 10 MW and 18 MW, particularly between 14 MW and 15 MW at 25° C. According to a further aspect, a method of operating a floating vessel is described.

9 Claims, 4 Drawing Sheets

(51) Int. Cl.
  *B63H 21/17*   (2006.01)
  *F02C 6/20*    (2006.01)
  *F01K 23/10*   (2006.01)
  *B63H 21/20*   (2006.01)
  *F01K 15/04*   (2006.01)
  *F02C 6/18*    (2006.01)
  *B63J 99/00*   (2009.01)

(52) U.S. Cl.
  CPC .............. *F01K 15/04* (2013.01); *F01K 23/10* (2013.01); *F02C 6/18* (2013.01); *F02C 6/203* (2013.01); *B63H 2021/202* (2013.01); *B63H 2021/207* (2013.01); *B63J 2099/003* (2013.01); *F05D 2220/72* (2013.01); *F05D 2220/76* (2013.01); *F05D 2260/40* (2013.01); *Y02T 50/60* (2013.01); *Y02T 70/50* (2013.01); *Y02T 70/5218* (2013.01); *Y02T 70/5236* (2013.01)

(56) References Cited

U.S. PATENT DOCUMENTS

2015/0323188 A1* 11/2015 Rista ................. F02C 9/40
                                                    440/88 F
2015/0362173 A1* 12/2015 Segerstrom ........... F02C 6/18
                                                    122/7 R

OTHER PUBLICATIONS

Edmunds, David B, ASD-TR-77-59, "Multivariable Control for a Variable Area Turbine Engine" Aug. 1977 (Year: 1977).*

Mik, David and Ann Viellette, TSPS Engineering Manual, 1995, Massachusetts Maritime Academy retrieved from https://weh.maritime.edu/campus/tsps/manual/toc0.html on Jan. 3, 2020 (Year: 1995).*

Search Report and Written Opinion issued in connection with corresponding IT Application No. 102017000003996 dated Sep. 25, 2017.

* cited by examiner

FLOATING VESSEL AND METHOD OF OPERATING A FLOATING VESSEL

BACKGROUND OF THE INVENTION

The present disclosure relates to a floating vessel, particularly to a tankship, more particularly to an LNG carrier configured to transport liquefied natural gas. The present disclosure further relates to a method of operating a floating vessel, particularly an LNG carrier. More specifically, the present disclosure relates to a floating vessel with a gas turbine engine-generator assembly and a steam turbine engine-generator assembly and to a method of efficiently operating such a floating vessel.

Storage tanks on at least some known liquefied natural gas (LNG) carrier vessels may not be refrigerated and may not be designed to withstand significant internal pressure. Therefore, LNG stored in the storage tanks may boil off during transit. This is known as natural boil-off gas (NBOG). The NBOG is continuously generated in the storage tanks of an LNG carrier and should be constantly managed to insure the safety of the vessel. The NBOG can be managed by utilizing the NBOG as a fuel source or for other processes onboard the ship, e.g. as a fuel source for an electrical energy generator system or a propulsion system.

When NBOG exists in excess amounts it may be combusted in a gas combustion unit (GCU) with the resultant heat and exhaust gas products generated vented overboard to the ambient atmosphere. As used herein, boil-off gas (BOG) covers two gas flows, natural BOG (NBOG) and forced BOG (FBOG).

Floating vessels with a gas turbine engine-generator assembly (GTG) for generating electrical energy have already been described. Gas turbines may be operated on boil-off gas. Gas turbines have advantages as compared to diesel engines. For example, gas turbines may have a lighter weight, may consume less space and may be beneficial regarding environmental aspects.

However, it would be beneficial to operate floating vessels with an improved efficiency and with a reduced overall energy and fuel consumption.

SUMMARY OF THE INVENTION

In light of the above, a floating vessel as well as a method of operating a floating vessel are provided.

According to one aspect of the present disclosure, a floating vessel, particularly an LNG carrier is provided. The floating vessel includes: a gas turbine engine-generator assembly configured to generate a first electrical power and to supply the first electrical power to an electrical distribution system, a steam turbine engine-generator assembly configured to generate a second electrical power and to supply the second electrical power to the electrical distribution system, and a propulsion system configured to propel the floating vessel using a propulsion power supplied from the electrical distribution system, wherein the gas turbine engine-generator assembly is configured to generate a maximum first electrical power between 10 MW and 18 MW, particularly between 14 MW and 15 MW at 25° C.

According to a further aspect of the present disclosure, a method of operating a floating vessel, particularly an LNG carrier is provided. The method includes: operating a gas turbine engine-generator assembly configured for generating a maximum first electrical power between 10 MW and 18 MW to generate a first electrical power and supply the first electrical power to an electrical distribution system, operating a steam turbine engine-generator assembly to generate a second electrical power and supply the second electrical power to the electrical distribution system, and propelling the floating vessel with a propulsion system using a propulsion power supplied from the electrical distribution system.

Further aspects, advantages, and features of the present disclosure are apparent from the dependent claims, the description, and the accompanying drawings.

BRIEF DESCRIPTION OF THE DRAWINGS

So that the manner in which the above recited features of the present disclosure can be understood in detail, a more particular description of the disclosure, briefly summarized above, may be had by reference to embodiments. The accompanying drawings relate to embodiments of the disclosure and are described in the following. Some embodiments are depicted in the drawings and are detailed in the description which follows.

DETAILED DESCRIPTION

Figure 1:
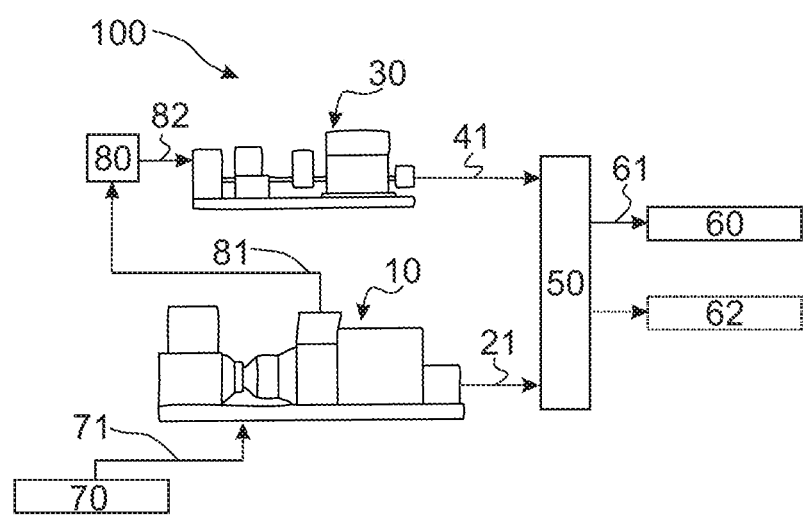
FIG. 1 is a schematic block diagram of a floating vessel according to embodiments described herein.

Reference will now be made in detail to the various embodiments of the disclosure, one or more examples of which are illustrated in the figures. Each example is provided by way of explanation and is not meant as a limitation. For example, features illustrated or described as part of one embodiment can be used on or in conjunction with any other embodiment to yield yet a further embodiment. It is intended that the present disclosure includes such modifications and variations.

Within the following description of the drawings, the same reference numbers refer to corresponding or to similar components. Generally, only the differences with respect to the individual embodiments are described. Unless specified otherwise, the description of a part or aspect in one embodiment applies to a corresponding part or aspect in another embodiment as well.

Embodiments described herein relate to a floating vessel, and particularly to an LNG carrier configured to carry and transport liquefied natural gas. In an LNG carrier, natural boil-off gas (NBOG) is essentially a "free" fuel source as a result of the LNG carrier operations and burns cleaner than traditional liquid fuels such as marine gas oil (MGO), e.g. diesel oil. Using NBOG from an LNG storage tank as a propulsion fuel for a floating vessel may be beneficial because the use of NBOG improves the economics of LNG shipping and reduces the environmental impact of LNG operations.

LNG carrier power and propulsion systems support a wide variety of routine ship operations. They vary in demand, duration and requirements for redundancy. During a typical cargo delivery cycle, the ship may experience the following basic operations.

Cargo Loading: This is typically a period where LNG is transferred from the onshore terminal's LNG storage tanks to the ship cargo tanks. If the tanks did not contain an LNG heel to maintain the cold temperatures and keep air out, tank purging and cool down would also be beneficial and add to the time needed for cargo operations. During cargo loading, NBOG will generally not be available to fuel the power plant of the ship. In various embodiments, depending on the ship type, typical electric loads are on the order of 2.5 MW to 5 MW.

In Port Provisioning, Bunkering and Crew Rest: The ship is idle in port except for maintenance activities, loading stores and replenishing liquid fuels and lube oil. The power levels could run from 1.5 MW to 3.5 MW, the lowest in the ship operating cycle.

Transiting In and Out of Port: The ship is underway at low speed, typically ten or twelve knots moving between the port facility and the open ocean. Power levels are intermediate, 3 MW to 13 MW. This is a time when maximum equipment redundancy is important. The harbor channels may be narrow and hazards of other harbor traffic may require a continuity of power. Frequently, LNG carriers will have tug escorts during these operations to mitigate the risk. In addition to tug escorts, ships use tugs for turning, positioning in the channel and movement to and from the pier. During tug operations, propulsion power could be zero at times.

Open Ocean Transit: Movement between the load port sea buoy and the sea buoy at the delivery port consumes the majority of the ship time. Ship's speed is subject to weather, seas, economic and schedule considerations. Ships may operate at the most economic speed, which may occur when the power plant consumes all NBOG and no forced boil-off gas (FBOG) is used. Open ocean transit is a part of the voyage where fuel economy may be more important than redundancy. Open ocean transit also has the highest power consumption. For example, the ship power system may generate a high power or the maximum available power.

Cargo Unloading: This is the period where the ship transfers the cargo to the shore terminal. In an example embodiment, power levels to drive the ship service loads and the cargo pumps are on the order of 8 MW.

Operators will choose an operating mode that best fits the circumstances and economics at the time.

For decades, the propulsion of LNG carriers was based on 2-stroke diesel engine technology. Recent pressure on the LNG shipping price has brought LNG shipping companies to change the traditional propulsion technology to innovative solutions which offer better economics.

For example, instead of diesel engines for generating a main portion of the propulsion power of a ship, a gas turbine engine-generator assembly (GTG) may be used. The GTG can be operated on boil-off gas, particularly on natural boil-off gas (NBOG). The GTG may be used in combination with a steam turbine engine-generator assembly (STG) which is driven by steam. The steam may be generated utilizing the hot exhaust gas from the GTG. As compared to diesel engines, the costs and the fuel consumption can be reduced, and more LNG in the same shipping travel may be transported.

A ship power system may include a gas turbine engine-generator assembly (GTG) including a gas turbine engine and a first electric generator driven by the gas turbine engine. The GTG may be configured to generate a first electrical power which may be supplied to an electrical distribution system of the floating vessel. The gas turbine engine may be fuelled with natural gas, particularly with natural boil-off gas (NBOG) from an LNG storage tank on the floating vessel.

The ship power system may further include a steam turbine engine-generator assembly (STG) including a steam turbine and a second electric generator driven by the steam turbine engine. The STG may be configured to generate a second electrical power which may be supplied to the electrical distribution system of the floating vessel. Additionally, diesel engines may be optionally provided.

In some embodiments, the hot exhaust gas from the GTG may be at least partially used for generating the steam for driving the STG. This can increase the efficiency of the ship power system. In particular, a combined cycle configuration including GTG and STG can achieve a high efficiency rate. It is alternatively or additionally also possible to burn BOG in a gas combustion unit for generating the steam for driving the STG.

Large gas turbine engines have conventionally been used on LNG carriers, in order to have the possibility to generate high electric power values for propelling the vessel at high speeds, e.g. gas turbine engines configured to deliver a shaft power of 25 MW or more. However, large gas turbine engines may entail drawbacks. For example, large gas turbine engines typically work at a maximum efficiency when being operated with the designed power output, wherein the floating vessel is propelled at a high navigation speed of, e.g., 19.5 knots or more. However, driving the vessel at a high navigation may consume a lot of fuel.

According to embodiments described herein, the ship power system including a GTG and an STG is designed with a focus on a medium navigation speed, e.g. a navigation speed of 18 knots or less, which may save a considerable amount of fuel. In particular, a smaller GTG configured for generating a reduced maximum power output and/or with a reduced shaft power of the gas turbine engine may be provided as compared to conventional floating vessels. In particular, a GTG with a reduced power rating and including a gas turbine engine with a reduced shaft power may be used in some embodiments. Notably, a smaller GTG works at a high efficiency when being operated with the designed power output, i.e. a reduced power output, wherein the floating vessel may be propelled at a reduced navigation speed. Accordingly, a design speed of the floating vessel may be reduced as compared to conventional floating vessels, but the energy efficiency and/or the fuel consumption may be increased.

This results in a compromise between the transport time—which may be increased as compared to the transport time of a ship navigating at a high navigation speed—and a fuel consumption—which may be considerably reduced as compared to a ship designed for a high navigation speed. Basically, the integration of a smaller-sized gas turbine model may give significant economic benefits due to a combination of fuel saving and extra revenues, e.g. due to an increased payload.

FIG. 1 is a schematic block diagram of the power system of a floating vessel 100 in accordance with embodiments described herein. The floating vessel 100 includes a GTG 10 configured to generate a first electrical power 21 and to supply the first electrical power 21 to an electrical distribution system 50, an STG 30 configured to generate a second electrical power 41 and to supply the second electrical power 41 to the electrical distribution system 50, and a propulsion system 60 configured to propel the floating vessel 100 using a propulsion power 61 supplied from the electrical distribution system 50. According to embodiments described herein, the GTG 10 is configured to generate a maximum first electrical power of 10 MW or more and 18 MW or less at standard conditions, particularly of 14 MW or more and 15 MW or less.

The maximum electrical power of a GTG as used herein may be understood as the power rating or as the designed power output of the GTG at standard conditions. Typically, the energy efficiency of a GTG is at a maximum when the GTG is operated at the designed power output. Accordingly, the GTG of a floating vessel according to embodiments described herein may be designed for a power output between 10 MW and 18 MW.

The shaft power of the gas turbine engine of the GTG may be slightly above the power rating of the GTG as the electrical generator of the GTG may entail some losses. For example, the shaft power of the gas turbine engine may be 11 MW or more and 19 MW or less, particularly 15 MW or more and 17 MW or less in some embodiments at standard conditions. Standard conditions as used herein may refer to atmospheric pressure and to a temperature of about 25° C.

In some embodiments, which may be combined with other embodiments described herein, the GTG may include a Nova™LT16 gas turbine, which may be configured for a shaft power of about 16.5 MW at standard conditions. Reference documents describing the technical details of the Nova™LT16 gas turbine are incorporated herein by reference.

It is noted that the power generated by a GTG may depend on the conditions and particularly on the temperature. For example, a GTG with the Nova™LT16 gas turbine may produce a maximum electrical power of 14.5 MW at 25° C. (which is the normal case in sea navigation), and the range may go from 11.3 MW at 50° C. to 18 MW at −20° C.

Using a "smaller sized" gas turbine model which is more "centered" to the load of a medium navigation speed of the ship may be more efficient in combination with the STG, resulting in an increased overall efficiency and/or a reduced fuel consumption as compared to the case of a "larger-sized" gas turbine model which is not "centered" to said design load.

Further, using a gas turbine engine-generator assembly in combination with a steam turbine engine-generator assembly may provide a gain of, e.g., 10% in extra payload cargo capacity, e.g. for liquefied natural gas LNG, as compared to previously used engine technologies.

In some embodiments, which may be combined with other embodiments described herein, the steam turbine engine-generator assembly 30 may be configured to generate a maximum second electrical power between 3 MW and 8 MW, particularly between 5 MW and 6 MW, particularly at standard conditions. The maximum second electrical power of the STG may be understood as the design output power or the power rating of the STG. The STG may operate at the design output power when the GTG is operated to generate the maximum first electrical power, and the hot exhaust gas from the GTG produces the steam for driving the STG.

For example, at standard conditions (25° C. ambient temperature, which is the normal case in sea navigation), the STG may produce a maximum second electrical power of 5 MW or more and 6 MW or less. Accordingly, e.g. when using the Nova'LT16 gas turbine model, the power system including GTG and STG may be configured to generate a total electrical power of 19 MW or more and 21 MW or less which is typically enough power to cover the electrical needs for a vessel speed between 17 knots and 18 knots.

In the case of an LNG carrier, the ship size is expressed by the ship cargo capacity. A typical value of a cargo capacity of an LNG carrier as described herein is 150,000 $m^3$ or more and 200,000 $m^3$ or less, particularly about 174,000 $m^3$.

In some embodiments, the propulsion system may be configured to propel the floating vessel at a maximum speed of 18 knots or less, when the propulsion power 61 corresponds to a sum of the maximum first electrical power and the maximum second electrical power. Accordingly, when the GTG and the STG both generate the respective design electrical output power, which is used as the propulsion power 61 via the electrical distribution system 50, the floating vessel may be propelled at a speed of 18 knots or less. It is noted that a part of the power generated by the GTG and STG which may be used as a ship service load 62 is considered to be zero in the above calculations. Depending on such additional power loads of the ship, the power available as the propulsion power 61 may be reduced accordingly.

According to some embodiments described herein, the GTG and the STG may be designed such that by utilizing the sum of the first electric power 21 and the second electric power 41 generated at a maximum efficiency by the GTG and/or the STG, the floating vessel may be propelled at a speed of 18 knots or less, particularly between 16 knots and 18 knots. No further power, e.g. power generated from a diesel engine may be required in this case.

In some embodiments, which may be combined with other embodiments described herein, the maximum first electrical power may be more than 50%, particularly more than 70%, of a total electrical power demand of the floating vessel, and/or the maximum second electrical power may be less than 50%, particularly less than 30%, of the total electrical power demand of the floating vessel. These ratios may allow the STG to be driven partially, mainly or entirely with steam heated via the hot exhaust gas of the GTG.

In some embodiments, which may be combined with other embodiments described herein, the GTG 10 may include a dual fuel gas turbine engine capable of being operated on boil-off gas 71 from an LNG reservoir 70 and on marine gas oil such as diesel oil. For example, the GTG 10 may include a Nova™LT16 gas turbine.

The floating vessel may further include a steam generator 80 configured to use a hot exhaust gas 81 from the GTG 10 and/or a hot gas from an oxidizing unit to generate steam 82, wherein the steam 82 may be configured to drive a steam turbine of the STG 30. The oxidizing unit may be a gas combustion unit configured to burn natural gas, e.g. NBOG and/or FBOG.

In some embodiments, which may be combined with other embodiments described herein, the floating vessel may further include one or more diesel engine-generator assemblies configured to provide a black start capability of the gas turbine engine-generator assembly 10 and/or to supply a third electrical power to the electrical distribution system 50. The diesel engine-generator assemblies may be configured for generating the third electrical power in a range between 2 MW and 5 MW.

When the diesel engine-generator assemblies are provided, the floating vessel 100 may be "forced" to higher navigation speeds, for example to a navigation speed of more than 18 knots, e.g. 19 knots or more, particularly 19.5 knots or more. For example, when a high navigation speed is needed, one, two or more additional diesel engines may be switched on to obtain an additional power of, e.g., 3 MW or more for the propulsion system 60. It is apparent that a "forced" high navigation speed causes an extra fuel consumption of the diesel engines.

In some embodiments, the propulsion system may be configured to propel the floating vessel at a speed of 19 knots more, e.g. 19.5 knots, when the GTG 10 generates the maximum first electrical power, the STG 30 generates the maximum second electrical power and the one or more diesel engine-generator assemblies generate the third electrical power. In other words, a navigation speed of more than 18 knots can be provided by operating not only the GTG and the STG, but also the diesel engine-generator assemblies. In this case, the propulsion power may correspond to a sum of the maximum first electrical power, the maximum second electrical power, and an additional power of, e.g. 3 MW or more that can be generated by the diesel engines.

For propelling the floating vessel 100 at a medium navigation speed of, e.g., 17-18 knots, there may be no need to switch on the one or more diesel engine-generator assemblies. The power system according to embodiments described herein may provide an improved efficiency combined cycle in this case. For propelling the floating vessel at a high navigation speed, e.g., 19.5 knots, the combined cycle efficiency may be better in the case of a GTG with a larger gas turbine, e.g. a GTG configured for generating 20 MW or more.

In some embodiments, the GTG 10 may include a two-shaft engine comprising a high-pressure turbine arranged on a gas compression shaft and configured for driving a gas compressor and/or a low-pressure turbine arranged on a power generation shaft and configured for power generation. A two-shaft engine may have an increased flexibility in reacting to a load rejection, because the rotational speeds of the high-pressure turbine and of the low-pressure turbine may be variable. For example, a two-stage high-pressure turbine and/or a two-stage low pressure turbine may be provided.

The low-pressure turbine (also referred to as the power turbine) may be configured for a rotational speed from 6,000 to 9,000 rpm. In particular, the rated nominal speed of the power turbine may be 7,800 rpm. Alternatively or additionally, the rated nominal speed of the high-pressure turbine may be from 9,000 to 12,000 rpm, particularly about 10,204 rpm.

In some embodiments, the availability of the gas turbine engine may be high, e.g. 90% or more or even up to 99% or more. Alternatively, or additionally, the gas turbine engine may be low-maintenance. For example, the gas turbine engine may be designed for a 35,000-hour mean time between maintenance.

The GTG 10 may be adapted to the operational needs of LNG carrier propulsion which may include one or more of the following: (i) the GTG 10 may be fuel flexible, i.e. capable of being operated on BOG 72 supplied from the LNG reservoir 70 and on an additional fuel, e.g. on marine gas oil (MGO), for example for situations where no BOG is available. (ii) the GTG 10 may be capable of being operated during severe sea conditions, e.g. during a storm, which may mean large angles of pitch and roll. (iii) the GTG 10 may be capable of accepting a variation of electrical load of the floating vessel, particularly including an acceptance of a full load rejection and/or of sudden load variations of 25% or more of the base load, particularly without a loss of flame of the gas turbine engine. The recovery time may be low. (iv) the power system including the GTG 10 may be compact and allow an additional payload of, e.g., 10% on the vessel frame as compared to a power system including exclusively diesel engines.

According to an aspect of the present disclosure, the floating vessel may include a GTG which has variable area turbine nozzles arranged between the high-pressure turbine and the low-pressure turbine. The variable area turbine nozzles may be configured to regulate a ratio of the rotational speeds of the high-pressure turbine and the low-pressure turbine. Accordingly, a high efficiency may be obtained not only at full load, but also on a partial load of the GTG. In particular, variable-geometry nozzles may be provided downstream from a two-stage high pressure turbine and upstream from a two-stage low pressure turbine for improving a part-load operation of the gas turbine engine.

A small-sized gas turbine engine may have a superior capability to accept a sudden variation of the electrical load (a full or a partial load rejection) without a loss of flame and with a fast recovery frequency. Further, variable area turbine nozzles between the high-pressure turbine and the low-pressure turbine may further improve the capability to withstand load variations without a loss of flame.

The GTG 10 may be configured to withstand a load rejection of 3 MW or more, particularly of 6 MW or more, more particularly a full load rejection, without a loss of flame. In particular, the gas turbine engine of the GTG 10 may be configured not to lose the flame in the case of a load rejection of 6 MW or more, or even in the case of a full load rejection.

In some embodiments, the GTG 10 may further include a multi-stage axial flow compressor, particularly comprising variable inlet guide vanes for providing an inlet gas flow control. For example, a 12-stage, high efficiency axial flow compressor may be provided. The compressor may be provided with one or more, particularly two or more, more particularly three variable-geometry vane stages, i.e. variable inlet guide vanes (VIGVs) and variable stage 2 and stage 3 vanes (VSVs). The guide vanes may be configured to rotate, varying the pitch of the airfoils in the compressor flow path, to provide an adequate stall margin and/or a high efficiency throughout the starting and operating conditions. In addition, fixed geometry vane stages may be provided in some embodiments.

Air entering the GTG may be directed into the axial compressor by an inlet casing, whereupon the air may be compressed to a ratio of 15:1 or more, particularly 19:1 in the axial compressor.

The compressed air leaving the axial compressor may be directed into an annular combustor where the compressed air may be mixed with the fuel, e.g. compressed natural gas. The fuel/air mixture may initially be ignited with a spark plug. Once combustion is self-containing, the spark plug may be turned off. In some embodiments, thirty burners or more, e.g. 39 burners may be provided.

The hot combustion gas may be directed into the high-pressure turbine which may drive the compressor rotor. The high-pressure turbine may be an axial flow reaction type turbine, e.g. including first and second stage turbine wheels.

The gas may further expand through the low pressure turbine which may drive the output load. Exhaust gases from the low pressure turbine may be turned by an exhaust diffuser and be discharged through an exhaust plenum flange.

The low-pressure turbine may include a rotor and a low-pressure stator assembly. The rotor may include a first stage turbine disk and a second stage turbine disk.

Figure 2:
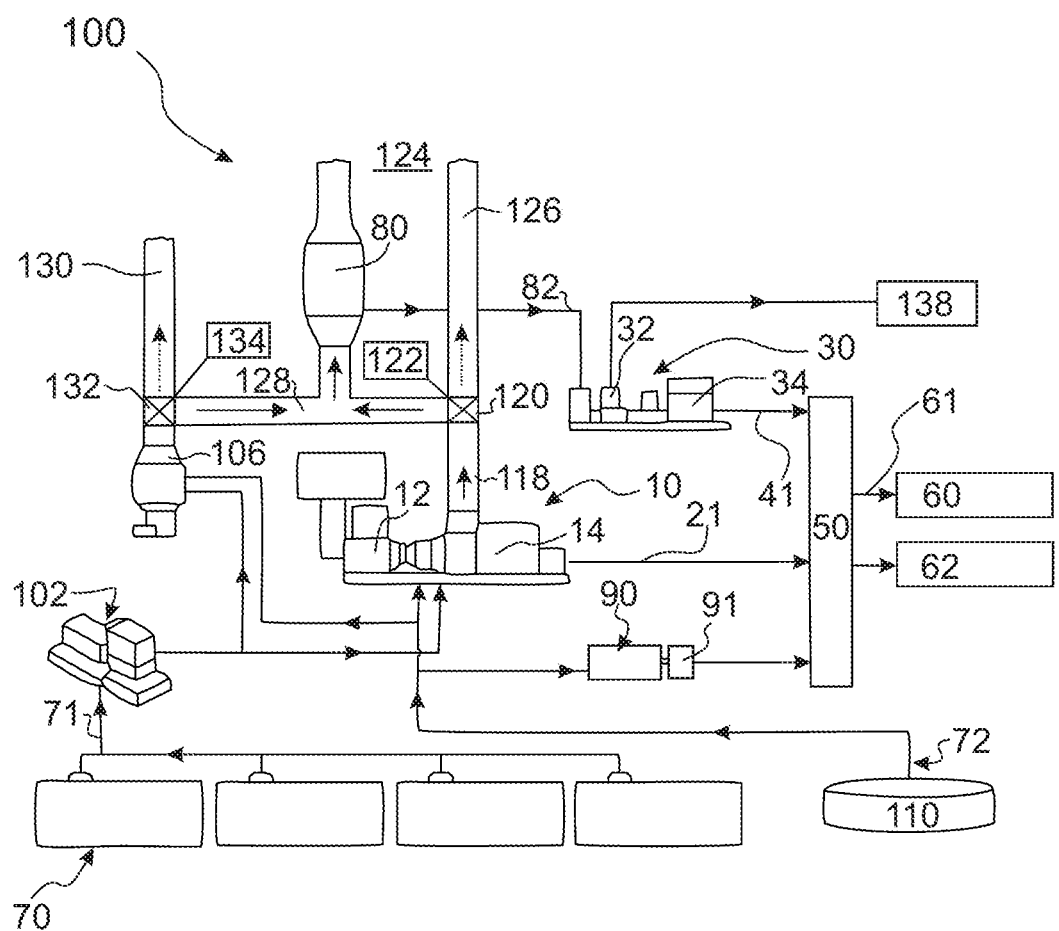
FIG. 2 is a schematic block diagram of a floating vessel according to embodiments described herein.

FIG. 2 is a schematic block diagram of a power system of a floating vessel 100 according to some embodiments described herein. The power system may include some features or all of the features of the power system described above with regard to FIG. 1, so that reference can be made to the above explanations which are not repeated here. The power system may be configured to supply shipboard electrical power and propulsion power for an LNG carrier.

In particular, the floating vessel 100 includes a GTG 10 with a gas turbine engine 12 and a first electrical generator 14, an STG 30 with a steam turbine engine 32 and a second electrical generator 34, and one or more diesel engine-generator assemblies 90 with one or more third electrical generators 91. The GTG 10 is configured to generate a first electrical power 21, the STG 30 is configured to generate a second electrical power 41, and the diesel engine-generator assemblies 90 are configured to generate a third electrical power.

The maximum first electrical power of the GTG 10 is 10 MW or more and 18 MW or less. In other words, the GTG is designed for an output power of between 10 MW or more and 18 MW or less.

In some embodiments, the floating vessel 100 includes a boil-off gas compressor 102 configured to receive BOG 71 from one or more LNG reservoirs 70, e.g. from LNG storage tanks. Compressed BOG may be channeled to a duel-fuel gas combustion unit 106 and/or to the GTG 10 which may be a duel-fuel gas turbine engine-generator assembly. Additionally, the gas combustion unit 106 can also burn a "free flow" of uncompressed boil-off gas.

In some embodiments, the floating vessel 100 includes a fuel reservoir 110 configured to channel marine gas oil (MGO) to the diesel engine-generator assembly 90 configured to supply an electrical power, e.g. during off-normal operations or for high speed navigation. The fuel reservoir 110 may also be configured to channel MGO to the gas combustion unit 106 and/or to the GTG 10. Although described as marine gas oil 72, the fuel reservoir 110 may include a variety of other fuels or fuel types.

In addition to supplying the first electrical power 21 to the electrical distribution system 50, the GTG 10 may also supply a steam generator 80 with a high temperature exhaust stream through an exhaust duct 118. The exhaust duct 118 may include a diverter valve 120 controlled by a diverter valve controller 122. The diverter valve 120 may be configured to modulate an amount of GTG exhaust flow to the steam generator 80 and/or to ambient 124 through a steam generator bypass stack 126.

The GTG exhaust stream may be channeled to the steam generator 80 through a crossover duct 128. Under certain conditions, the GTG 10 may not be able to consume all of the NBOG generated in the LNG reservoir 70. During such conditions, an alternate path for the NBOG to the gas combustion unit 106 may be used. The gas combustion unit 106 may oxidize the NBOG, generating a stream of hot exhaust gases that is channeled to ambient 124 through a stack 130 and/or to the crossover duct 128 through a diverter valve 132, which may be controlled by a diverter valve controller 134.

Accordingly, the steam generator 80 can be supplied by hot exhaust gases from the GTG 10 and/or from the gas combustion unit 106 through the crossover duct 128 and each stream of hot exhaust gases may be controlled by a respective diverter valve.

Under other conditions, it may be beneficial to be able to generate more steam than is possible to generate using NBOG processed through the GTG 10 and/or the gas combustion unit 106. In this case, FBOG may be used to fuel the gas combustion unit, such as on the ballast voyage when NBOG flow may not be sufficient to allow the STG 30 to reach the full power.

The diverter valves 120 and 132 may be controlled by respective controllers 122 and 134. Although described as individual stand-alone controllers, the controllers 122 and 134 may be combined into a single controller or may be embodied within a larger power plant control system. The diverter valves 120 and 132 are controlled by respective controllers 122 and 134 to ensure that exhaust gas from the gas combustion unit 106 channeled to the steam generator 80 provides sufficient back pressure to ensure a stable and balanced flow of exhaust gases under all operating conditions.

The steam generator 80 may be configured to generate steam from the hot exhaust gas from the GTG 10 and/or from the gas combustion unit 106 supplied through the crossover duct 128. The generated steam may be channeled to the STG 30 configured to generate the second electrical power 41, which may be directed to the electrical distribution system 50. A first portion of the depleted steam from the STG 30 may be channeled to one or more shipboard steam loads 138. Ship heating steam may be derived from a reducing valve located upstream of the steam turbine (steam flow less than approximately 85%) or from extraction steam (depleted steam) taken from the steam turbine engine (power >85%). A second portion of the depleted steam from the STG 30 may be condensed in a condenser and recycled back to the steam generator 80 through a condensate system (not shown) and a feed water system (not shown).

During operation, the floating vessel may include a plurality of fundamental operating modes based at least on a total power demand, available operating equipment, operating environment and an electric plant configuration. Sub-modes of each of the fundamental operating modes may take into account different fuel supplies (liquid or gas), emission requirements, and a potential use of the black start emergency diesel to increase power.

For example, some or all of the following operating modes may be provided: Plant Shut Down (Mode 0); GTG and STG Combined Cycle Parallel Electric Plant Operation (Mode 1); GTG and STG Combined Cycle Split Electric Plant Operation (Mode 2); GTG Simple Cycle (Mode 3); STG Bottoming Cycle with gas combustion unit Heat Source (Mode 4); High Redundancy Split Electric Plant (Mode 5); High Redundancy Parallel Electric Plant Operation (Mode 6).

The GTG 10 may include some or all of the features described above with reference to FIG. 1, so that reference can be made to the above explanations which are not repeated here.

Figure 3:
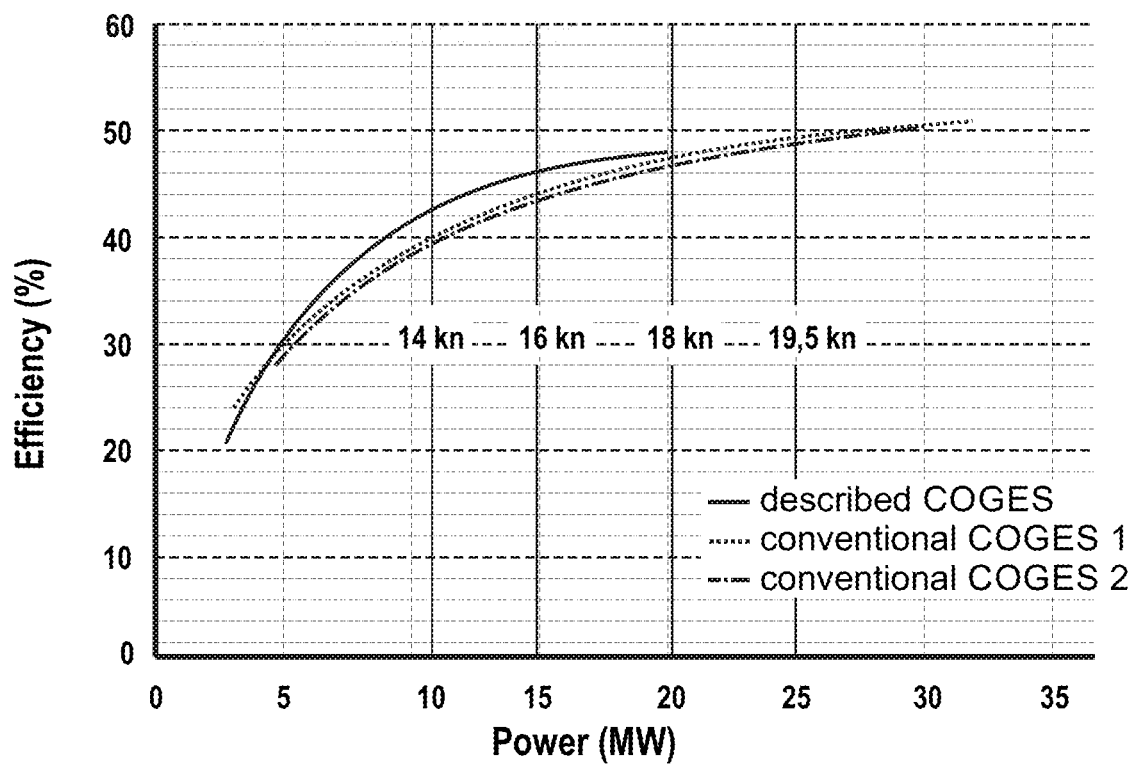
FIG. 3 is a graph illustrating the improved efficiency of a floating vessel according to embodiments described herein.

FIG. 3 is a graph illustrating the improved efficiency of a floating vessel according to embodiments described herein. The y-axis shows the gross electrical efficiency of the combined gas and steam electrical generation system, also referred to as COGES plant. The x-axis shows the sum of the first electrical power and the second electrical power generated by the GTG and the STG (COGES plant gross power).

It is shown that the efficiency of a COGES plant according to embodiments described herein is higher in a range of COGES plant gross power from about 5 MW to about 20 MW, corresponding to a navigation speed of the floating vessel from about 10 knots to about 18 knots, as compared to a conventional COGES plant. On the other hand, the COGES plant according to embodiments described herein may not be capable of propelling the floating vessel at a navigation speed higher than about 18 knots without additional power which may be provided by a diesel engine. For propelling the floating vessel at high navigation speeds of, e.g. 19.5 knots or more, the efficiency of the conventional COGES plant may be sufficient. However, in a speed range of 18 knots or less, the COGES system according to embodiments described herein provides improved efficiency values.

For example, when using a COGES plant including a Nova™LT16 gas turbine engine, at a low speed of 17 knots, there is no need to switch on a supplementary engine, and the COGES plant results in an improved efficiency of 47% as compared to the 45% of a conventional COGES plant. If the navigation speed is higher, e.g. 19.5 knots, the efficiency of the conventional COGES plant may be higher, e.g. 49%, as there is probably no need to switch on additional diesel engines. A low power of about 16 MW may be needed for propulsion at 17 knots verses a high power demand for a propulsion at 19.5 knots (23.28 MW). A considerable amount of fuel can be saved.

According to a further aspect, a method of operating a floating vessel, particularly a tankship, more particularly an LNG carrier, is described.

Figure 4:
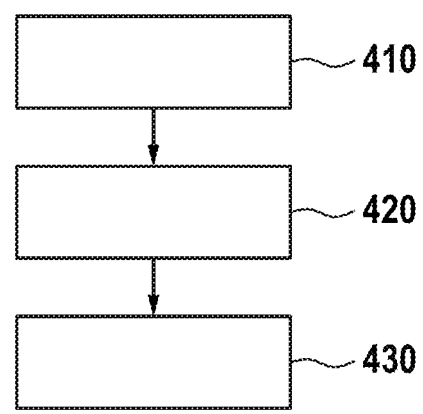
FIG. 4 is a flow diagram illustrating a method of operating a floating vessel according to embodiments described herein.

As is illustrated in FIG. 4, in box 410, a GTG 10 configured to generate a maximum first electrical power between 10 MW and 18 MW, and an STG 30 are provided on a floating vessel. In other words, the GTG 10 that is provided onboard the floating vessel may have a design output power or a power rating of 10 MW or more and 18 MW or less.

In box 420, the GTG 10 is operated to generate a first electrical power 21, and the first electrical power 21 is supplied to an electrical distribution system 50. Further, the STG 30 is operated to generate a second electrical power 41, and the second electrical power 41 is supplied to the electrical distribution system 50.

In box 430, the floating vessel is propelled with a propulsion system 60 using a propulsion power 61 supplied from the electrical distribution system 50.

In some embodiments, the floating vessel may be propelled at a speed of 18 knots or less, e.g. from 17 knots to 18 knots, with a propulsion power of 19-21 MW, which may approximately correspond to a sum of the maximum first electrical power and a maximum second electrical power. In other words, when the GTG 10 and/or the STG 30 are operated in a high efficiency range which may correspond to the respective design power outputs of the GTG and/or of the STG, the floating vessel may navigate at a speed of 18 knots or less. Fuel consumption can be reduced.

In some embodiments, one or more diesel engine-generator assemblies 90 may be operated to generate a third electrical power 92 and to supply the third electrical power 92 to the electrical distribution system 50. Depending on the power requirements of the floating vessel, the third electrical power may be in a range from 2 MW to 5 MW.

For example, the floating vessel may be propelled at a speed of 18 knots or more, e.g. between 19 knots and 20 knots, with a propulsion power in the range of 22-26 MW. This power may correspond to a sum of the maximum first electrical power, a maximum second electrical power, and a third power, which may be generated by the one or more diesel engine-generator assemblies. In particular, the GTG and/or the STG may be operated in a high efficiency range which may correspond to the respective power rating of the GTG and/or the STG, and additional power may be generated by the one or more diesel engine-generator assemblies, in order to "force" the propulsion system to propel the floating vessel at a high navigation speed. Fuel consumption, particularly diesel consumption, may rise.

In some embodiments, e.g. also during open ocean transit, the floating vessel may be operated in a first operation mode with a propulsion power below a reference level. Therein, no third electrical power 92 may be supplied to the electrical distribution system 50, and the floating vessel may navigate at a speed of 18 knots or less.

In some embodiments, e.g. in exceptional situations or in a case of urgency, the floating vessel may be operated in a second operation mode with a propulsion power above the reference level. Therein, the third electrical power may be supplied to the electrical distribution system 50, and the floating vessel may navigate at a speed of more than 18 knots. In the second operation mode, the GTG and/or the STG may be operated to generate a power corresponding the respective power rating.

Typically, the GTG 10 may be partially or entirely operated on boil-off gas 71 from an LNG reservoir 70, e.g. on NBOG only. No forced boil-off may be needed.

In some embodiments, operating the GTG 10 may include adjusting variable area turbine nozzles arranged downstream from a high-pressure turbine and upstream from a low-pressure turbine of the gas turbine engine of the GTG 10, for regulating a ratio of the rotational speeds of the high-pressure turbine and the low-pressure turbine.

Therein, the variable area turbine nozzles may be adjusted in dependence of a first electrical power demand and/or in the case of a load rejection at the GTG 10.

While the foregoing is directed to embodiments of the disclosure, other and further embodiments of the disclosure may be devised without departing from the basic scope thereof, and the scope thereof is determined by the claims that follow.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A floating vessel comprising:
 a gas turbine engine-generator assembly comprising a dual fuel gas turbine engine operable on both boil-off gas from an LNG reservoir and on marine gas oil, wherein the gas turbine engine-generator assembly is configured to generate a first electrical power and to supply the first electrical power to an electrical distribution system, a maximum of the first electrical power being between 10 MW and 18 MW;
 a steam turbine engine-generator assembly configured to generate a second electrical power and to supply the second electrical power to the electrical distribution system, wherein a portion of depleted steam from the steam turbine engine-generator assembly is channeled to one or more steam loads aboard the floating vessel;
 a steam generator configured to receive hot gas exhausted from the gas turbine engine-generator assembly and hot gas exhausted from an oxidizing unit to generate steam, wherein the steam is configured to drive a steam turbine of the steam turbine engine-generator assembly; and
 a propulsion system configured to propel the floating vessel using a propulsion power supplied from the electrical distribution system,
 wherein the gas turbine engine-generator assembly further comprises a first exhaust duct in fluid communication with a crossover duct to channel the hot gas exhausted from the gas turbine engine-generator assembly to the steam generator, the exhaust duct including a first diverter valve to modulate an amount of the hot gas exhausted from the gas turbine engine-generator assembly that is fed to the steam generator.

2. The floating vessel of claim 1, wherein the oxidizing unit is a dual fuel gas combustion unit comprising a second exhaust duct in fluid communication with the crossover duct, the second exhaust duct including a second diverter valve to modulate an amount of hot gas exhausted from the gas combustion unit that is fed to the steam generator, the first and second diverter valves collectively being controlled by at least one controller to ensure that the hot gas from the gas combustion unit channeled to the steam generator provides sufficient back pressure to ensure a stable and balanced flow of the hot gas from the gas turbine engine-generator assembly and the hot gas form the gas combustion unit under all operating conditions.

3. The floating vessel of claim 1, wherein another portion of depleted steam from the steam turbine engine-generator assembly is condensed in a condenser and recycled back to the steam turbine engine-generator assembly.

4. The floating vessel of claim 1, wherein the propulsion system is configured to propel the floating vessel at a maximum speed of 18 knots or less, when the propulsion power corresponds to a sum of the maximum first electrical power and the maximum second electrical power.

5. The floating vessel of claim 1, further comprising one or more diesel engine-generator assemblies configured to provide a black start capability of the gas turbine engine-generator assembly and/or configured to supply a third electrical power to the electrical distribution system, wherein the third electrical power is between 2 MW and 5 MW.

6. The floating vessel of claim 5, wherein the propulsion system is configured to propel the floating vessel at a maximum speed of 19 knots more, when the gas turbine engine-generator assembly generates the maximum first electrical power, the steam turbine engine-generator assembly generates the maximum second electrical power and the one or more diesel engine-generator assemblies generate the third electrical power.

7. The floating vessel of claim 1, wherein the gas turbine engine is a two-shaft engine comprising a high-pressure turbine arranged on a gas compression shaft and configured for driving a gas compressor and a low-pressure turbine arranged on a power generation shaft and configured for power generation.

8. The floating vessel of claim 7, wherein the gas turbine engine-generator assembly comprises variable area turbine nozzles arranged between the high-pressure turbine and the low-pressure turbine and configured to regulate a ratio of the rotational speeds of the high-pressure turbine and the low-pressure turbine.

9. The floating vessel of claim 7, wherein the gas turbine engine-generator assembly comprises a multi-stage axial flow compressor comprising variable inlet guide vanes for providing an inlet gas flow control.

* * * * *